United States Patent [19]

Ritter

[11] 4,300,593

[45] Nov. 17, 1981

[54] BACK PRESSURE REGULATOR AND NON-RETURN VALVE

[76] Inventor: Robert A. Ritter, c/o 3427 - 12 St., N.E., Calgary, Alberta, Canada, T2E 6S6

[21] Appl. No.: 117,226

[22] Filed: Jan. 31, 1980

[30] Foreign Application Priority Data

Jan. 4, 1980 [CA] Canada ................................. 343085

[51] Int. Cl.³ ............................................. F16K 15/14
[52] U.S. Cl. .............................. 137/512.15; 137/613; 137/853
[58] Field of Search ........... 137/512.15, 512.4, 516.15, 137/853, 625.3, 625.37, 613, 614.16, 614.17

[56] References Cited

U.S. PATENT DOCUMENTS

| | | | |
|---|---|---|---|
| 384,306 | 6/1888 | Bourdil | 137/853 X |
| 1,854,518 | 4/1932 | Little | 137/516.15 |
| 2,482,651 | 9/1949 | Burt | 137/853 X |
| 3,384,113 | 5/1968 | Pennisi | 137/853 |
| 3,880,399 | 4/1975 | Luthe | 137/625.37 X |

*Primary Examiner*—William R. Cline
*Attorney, Agent, or Firm*—Birch, Stewart, Kolasch & Birch

[57] ABSTRACT

A back pressure regulator and non-return valve is provided herein. It includes a hollow plug having an open inlet end and a closed end having a central aperture therethrough. A closure cap is hermetically slidably disposed within the hollow plug. A plurality of outlet perforations are provided from the hollow plug, the apertures being disposed along helical paths along the outer periphery thereof. Finally, a tubular resilient diaphragm sleeve of non-uniform wall thickness envelopes the apertured portion of the hollow plug, the resilient sleeve being secured to the hollow plug at its base only adjacent the open inlet end thereof. Control of the outflow through an annular outflow path between the hollow plug and the tubular resilient diaphragm to require greater gaseous pressure is provided by changing the number of the outlet apertures in the effective outlet length of the hollow plug. The threshold pressure required to move the diaphragm away from the hollow plug to provide the annular outflow path is increased, dependent on the wall thickness. Gas having a pressure lower than that threshold pressure will not flow out. Non-return function is provided by gas pressure on the outside of the tubular resilient diaphragm which seals the annular outflow path.

6 Claims, 1 Drawing Figure

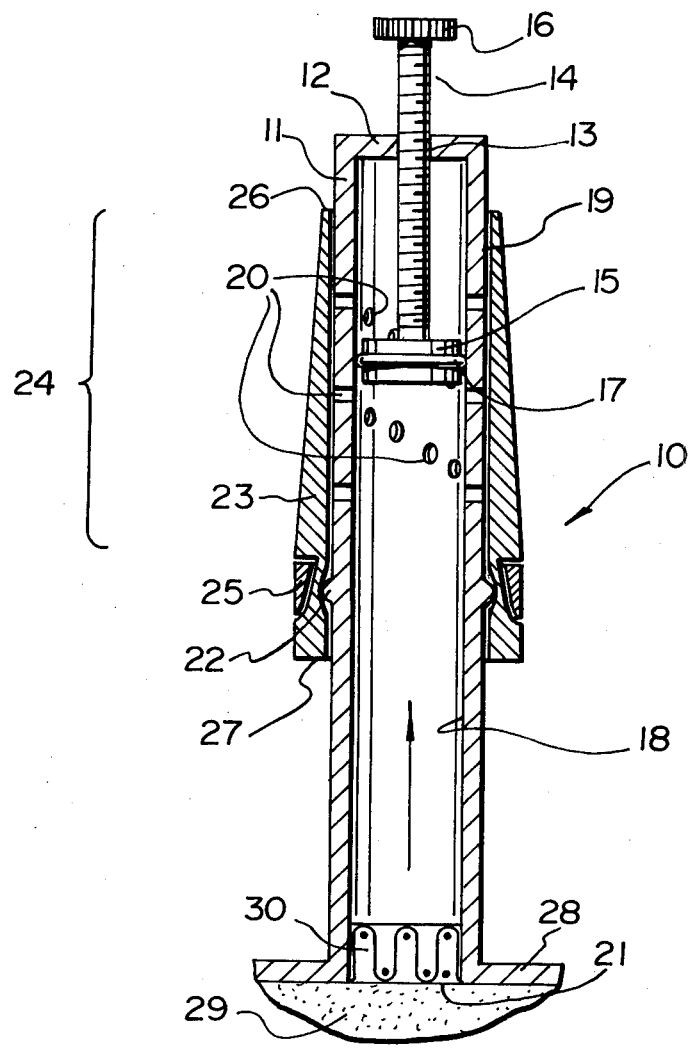

BACK PRESSURE REGULATOR AND NON-RETURN VALVE

BACKGROUND OF THE INVENTION (i) Field of the Invention

This invention relates to a back pressure regulator and non-return valve for use in any system where gas is required to flow at a selected maximum pressure in one direction only. In one use, the back pressure regulator and non-return valve is used in a system and an apparatus for the separation of a mixture of gases and vapors into its constituent components, e.g., in the separation and recovery of oxygen from air, or in the separation and recovery of hydrogen from a hydrocarbon gas mixture.

(ii) Description of the Prior Art

As noted above, a back pressure regulator and non-return valve is useful in systems and apparatuses which have been proposed to separate a mixture of gases and vapors into its constituent components. Most such systems and apparatuses involve either complicated procedures or require the use of equipment which is expensive both to assemble and to operate. All of the systems of the prior art, including improved systems taught in Canadian Pat. No. 986,424 issued Mar. 30, 1976 to Robert A. Ritter and David G. Turnbull and in copending United States patent application Ser. No. 107,860, require a back pressure regulator and non-return valve at one or more points in the system.

One suggestion for such a back pressure regulator and non-return valve is taught in the aforementioned copending United States patent application Ser. No. 107,860 which taught a back pressure regulator and non-return valve comprising: a capped hollow plug having at least one perforation through the wall thereof; a tubular molded diaphragm disposed along the central region of the plug, the diaphragm having walls whose thickness decreases gradually from the bottom to the top thereof, the diaphragm being secured only at the bottom thereto but being selectively movable longitudinally along the capped hollow plug, to situate the diaphragm with respect to the aperture so that a selected diaphragm thickness is opposite the aperture; and means for supplying gas under pressure within the hollow plug; whereby the unsecured area of the diaphragm is urged open upon the application of a selected pressure dependent on the thickness of the diaphragm opposite the aperture, thereby to provide an annular flow passage.

SUMMARY OF THE INVENTION (i) Aims of the Invention

While this regulator and valve satisfactorily provided an operative valve, it was somewhat inconvenient to change the value of the selected pressure necessary to cause the regulator to open to provide the annular flow passage when it was desired to change the flow characteristics of the system.

Accordingly, an object of the present invention is to provide an improved, easily adjustable back pressure regulator and non-return valve.

(ii) Statement of the Invention

By this invention, then, an improved back pressure regulator and non-return valve is provided, comprising: (1) a hollow plug having an open inlet and one end closed, such closed end having a central aperture therethrough; (2) a closure cap hermetically slidably disposed within the hollow plug, the closure cap having an extending rod disposed through the central aperture the closure cap being adapted to be selectively positioned along the longitudinal length of, and within, the hollow plug by movement of the extending rod; (3) a plurality of outlet perforations from the hollow plug, the perforations being disposed along at least one helical path along the outer periphery thereof, to provide a combined outflow from the hollow plug; and (4) a tubular resilient diaphragm sleeve whose wall thickness varies along its length, being thicker at its base enveloping the perforated portion of the hollow plug, the resilient sleeve being secured to the hollow plug at its base only adjacent the open inlet end thereof; whereby control of the combined outflow through an annular outflow path between the hollow plug and the tubular resilient diaphragm to require greater gaseous pressure is provided by longitudinal movement of the closure cap by longitudinal movement of the extending rod, thereby to change the effective length of the hollow plug, to alter the number of the outlet perforations in the effective outlet length of the hollow plug, and to provide greater wall thickness of the diaphragm at the effective outlet length of the outlet plug remaining, and thereby to increase the threshold gaseous pressure required to move the thicker portions of the diaphragm away from the hollow plug to provide the annular outflow path.

(iii) Other Features of the Invention

By another feature of this invention, the closure cap is a piston whose head is provided with sealing means to provide a slidable hermetic seal.

By a further feature of this invention, the outlet perforations are disposed along a pair of non-connected helical paths.

By yet another feature of this invention, the tubular diaphragm is secured to the hollow plug by cooperation between a tapered locking ring and an annular locking projection on the hollow plug.

By a still further feature of this invention, the extending rod is a threaded rod, extending through an internally threaded central aperture and which is provided with an operating knob, whereby rotation of the operating knob moves the closure cap longitudinally.

By yet another feature of this invention, the tubular diaphragm is formed from butyl rubber.

BRIEF DESCRIPTION OF THE DRAWINGS

In the accompanying drawing, the single FIGURE is a longitudinal cross-section through a back pressure regulator and non-return valve of one embodiment of this invention.

DESCRIPTION OF A PREFERRED EMBODIMENT

The back pressure regulator and non-return valve 10 as shown includes a hollow plug 11 having one closed end 12 provided with an aperture 13 through which the slidable rod 14 of a piston including a head 15 passes. While it is desirable that rod 14 slide through aperture 13 in a substantially hermetically sealed fashion, successful operation of the regulator and valve 10 of one embodiment of this invention does not require this to be so. The rod 14 terminates in an operating knob 16, while the head 15 is provided with suitable sealing means, e.g., O-ring 17, to provide a slidable hermetic seal between the head 15 and the inside wall 18 of the plug 11. The outer wall 19 of plug 11 is provided with at least one set, and preferably two sets, of non-connected helically oriented outlet perforations. The wall 19 thereof close to the open end 21 is provided with an annular locking projection 22. A tubular diaphragm 23 is disposed over the helically perforated mid-portion 24 of the hollow plug 11 and is retained thereon by a tapered retaining ring 25. While a tapered retaining ring 25 is shown, any other equivalent clamping means may be used. Tubular diaphragm 23 should taper gradually from the top 26 to the bottom 27 thereof so that the wall thickness is different along the length thereof. This permits a simple yet effective back pressure regulator and non-return valve to be provided, as will be described hereinafter.

The regulator and valve 30 as shown is secured to an adsorption vessel 28 filled with a suitable adsorbent 29, held in place by means of a suitable hold-down means 30, all as described in detail in copending United States patent application Ser. No. 107,860.

The tubular diaphragm may be produced from any suitable elastomeric material. However, butyl rubber provides certain advantages in the present application since, besides its suitable endurance to repeated flexing, it is virtually totally impervious to air, and more importantly, to water vapor which, if permitted to enter the adsorber system, could eventually result in the irreversible deactivation of the adsorbent.

OPERATION OF THE PREFERRED EMBODIMENT

This very simple device is, nonetheless, capable of performing the dual role of back pressure regulator and non-return valve. The cylindrical hollow plug is closed at one end and is encased in a tightly fitting tubular diaphragm which varies in wall thickness along its length. The diaphragm seals the small helically arranged perforations in the wall of the hollow plug which communicate with the hollow core. Upon application of sufficient gas pressure in the core, the diaphragm is caused to expand away from the perforations and to permit an escape of gas through the annulus formed between the resilient diaphragm and the hollow plug. The size of this annulus or annular aperture is determined by the differential pressure across the diaphragm and, consequently, provides a proportional mode of control of the pressure. Adjustment of the pressure to the desired level is achieved by moving the piston head longitudinally downwardly along the length of the hollow plug, thereby varying the number of apertures opposite the diaphragm wall. The greater the number of apertures, the lower the pressure differential within the plug required to "open" the annular aperture. Moreover, the tubular diaphragm varies in wall thickness along its length, being thicker at its base. Accordingly the wall thickness is greater at the outlet apertures in the effective outlet length of the outlet plug remaining. Thus, the threshold gaseous pressure required to move the diaphragm away from the hollow plug to provide the annular outflow path is increased, and consequently gas having a lower pressure than that threshold pressure will not flow out. Pressure on the outside of the diaphragm urges the diaphragm into sealing engagement with the plug, and hence causes the valve to operate as a non-return, or one-way, valve. Thus, this valve also functions as an effective non-return valve since any tendency toward flow reversal implies a negative pressure gradient between the hollow core and the region surrounding the plug. This simply results in an increased sealing pressure between the annulus or annular aperture of the tubular diaphragm and the perforations.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:
1. A back pressure regulator and non-return valve comprising:
   (1) a hollow plug having an open inlet end and one closed end, said closed end having a central aperture therethrough;
   (2) a closure cap hermetically slidably disposed within said hollow plug, said closure cap having an extending rod disposed through said central aperture, said closure cap being adapted to be selectively positioned along the length of, and within, said hollow plug by movement of said rod;
   (3) a plurality of outlet perforations from said hollow plug, said perforations being disposed along at least one helical path along the outer periphery thereof, to provide a combined outflow from said hollow plug;
and
   (4) a tubular resilient diaphragm sleeve enveloping the perforated portion of said hollow plug, said resilient sleeve being secured to said hollow plug at its base only adjacent the open inlet end thereof, said tubular resilient diaphragm sleeve having walls whose thickness decreases gradually from the secured portion thereof to the unsecured portion thereof;
whereby
   (5) control of the combined outflow through an annular outflow path between said tubular resilient diaphragm and said hollow plug to require greater gaseous pressure is provided by longitudinal movement of said closure cap, by longitudinal movement of said extending rod thereby to change the effective length of said hollow plug, to alter the number of said outlet perforations in said effective outlet length of said hollow plug and to provide greater wall thickness of the diaphragm at the effective length of said outlet plug remaining, and thereby to increase the threshold gaseous pressure required to move the thicker portions of the diaphragm away from the hollow plug to provide the annular outflow path.

2. The back pressure regulator and non-return valve of claim 1 wherein said closure cap is a piston whose head is provided with sealing means to provide a slidable hermetic seal.

3. The back pressure regulator and non-return valve of claim 1 wherein said outlet perforations are disposed along a pair of non-connected helical paths.

4. The back pressure regulator and non-return valve of claim 1 wherein said tubular diaphragm is secured to said hollow plug by cooperation between a tapered locking ring and an annular locking projection on said hollow plug.

5. The back pressure regulator and non-return valve of claim 1 wherein said extending rod is a threaded rod extending through a central aperture which is internally threaded and provided with an operating knob, whereby rotation of said operating knob moves said closure cap longitudinally.

6. The back pressure regulator and non-return valve of claim 1 wherein said tubular diaphragm is formed from butyl rubber.

* * * * *